Feb. 19, 1952     A. J. SHMIDL     2,586,729
PRODUCTION OF AMMONIUM SULFATE
Filed Dec. 7, 1950
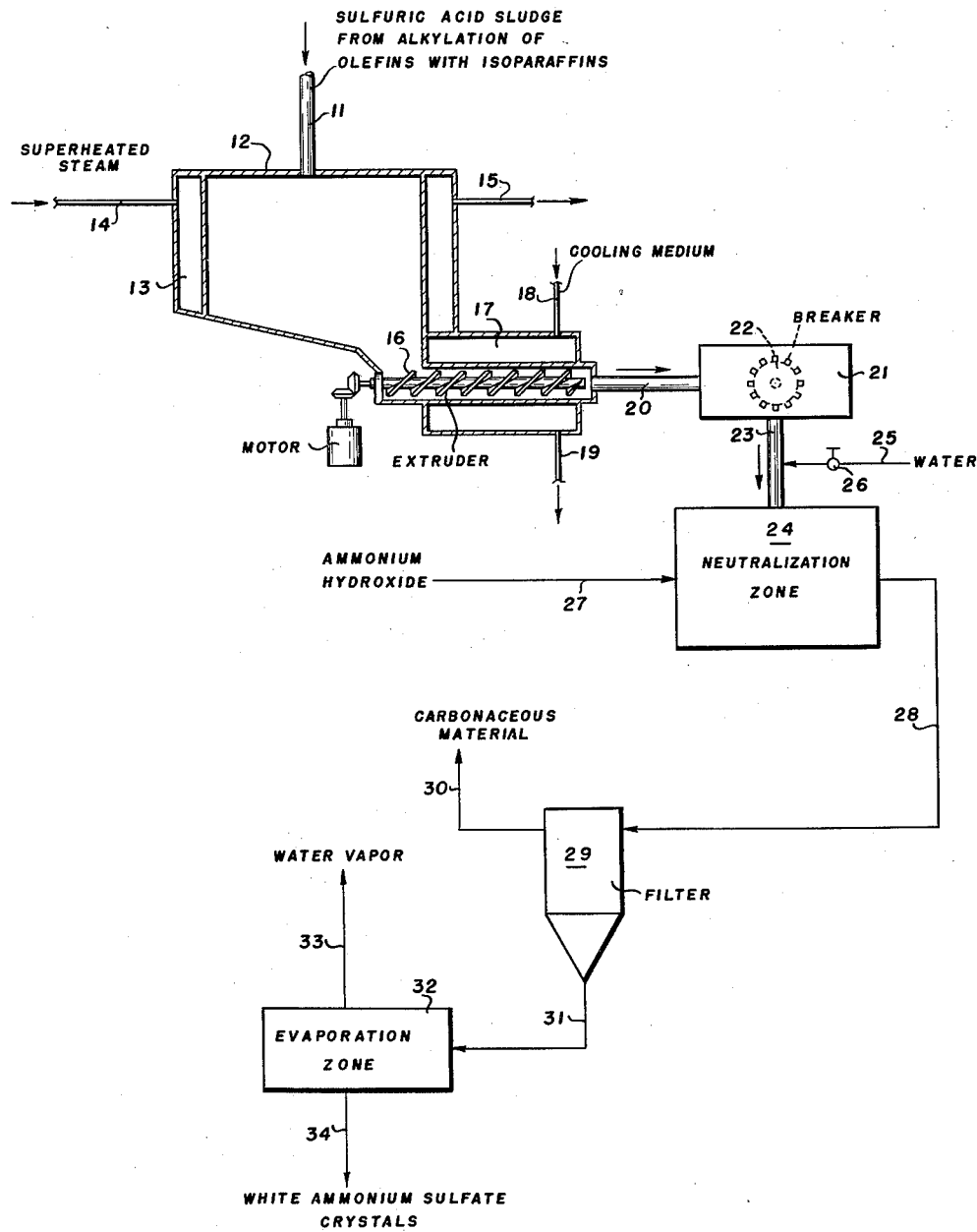
INVENTOR.
Albert J. Shmidl,
BY
AGENT.

Patented Feb. 19, 1952

2,586,729

UNITED STATES PATENT OFFICE 2,586,729

PRODUCTION OF AMMONIUM SULFATE

Albert J. Shmidl, Houston, Tex., assignor, by mesne assignments, to Standard Oil Development Company, Elizabeth, N. J., a corporation of Delaware Application December 7, 1950, Serial No. 199,668

12 Claims. (Cl. 23—119)

The present invention is directed to the production of ammonium sulfate for employment as fertilizer. More particularly, the invention is directed to a process for producing ammonium sulfate from sulfuric acid sludge derived from the alkylation of olefins with isoparaffins in the presence of strong sulfuric acid.

In the present invention ammonium sulfate crystals substantially free of carbonaceous matter are produced from sulfuric acid sludge derived from the alkylation of olefins with isoparaffins in the presence of strong sulfuric acid which contains substantial quantities of carbonaceous bodies. Such sulfuric acid sludges contain a substantial amount of carbonaceous material, such as described in the patent to Wadley and Horeczy, 2,425,584, of August 12, 1947. These sulfuric acid sludges are discarded from the alkylation system and may have a concentration of sulfuric acid ranging from about 84% to 90% and may contain water in the order of 1% to 2% and carbonaceous material ranging from about 5% to 15%. It is contemplated in the present invention that such sulfuric acid sludges and others which are discarded in the aforementioned alkylation process may be used for production of carbon-free ammonium sulfate.

The feature of the present invention involves heating such sulfuric acid sludges to a temperature in the range between 280° and 325° F. to cause gelation or solidification of the sulfuric acid sludge; following this heating and gelling operation the sludge is admixed with a sufficient amount of ammonium hydroxide to obtain substantial neutralization of the acidic constituents thereof. The sludge may have sufficient ammonium hydroxide added thereto to bring the mass up to a pH in the range from about 5.5 to 6.5. Thereafter the carbonaceous bodies may be easily removed or separated from the aqueous solution of ammonium sulfate. The removal may be accomplished by filtration to leave a clear aqueous solution of ammonium sulfate from which crystals of ammonium sulfate may be recovered by evaporating water from the aqueous solution thereof.

The yields of ammonium sulfate recoverable in the process of the present invention on the basis of free sulfuric acid in the sludge may range from 50% to 67% by weight. However, higher yields as much as 80% by weight are obtainable and particularly when the temperature of the heated and gelled sludge is quickly reduced to a temperature no greater than 200° F. after the heating and gelling operation. The temperature may be reduced subsequent to the heating and gelling operation to a temperature in the range between 125° F. and 200° F.

The present invention will be illustrated further by reference to the drawing in which the single figure represents a preferred mode of practicing the present invention.

Referring now to the drawing, numeral 11 designates a charge line by way of which a sulfuric acid sludge from the alkylation of olefins with isoparaffins is introduced into the system from a source not shown. Line 11 introduces the sludge into a heating and gelling zone 12 which is provided with a jacket 13 into which may be introduced by line 14 a heating fluid, such as superheated steam, which circulates through jacket 13 and outwardly therefrom by line 15. Circulation of superheated steam through jacket 13 raises the temperature of the sulfuric acid sludge in zone 12 to a temperature in the range between 280° and 325° F. whereby gell formation and at least partial solidification of the sulfuric acid sludge results. The time of heating in zone 15 may range from about 5 minutes up to about 30 minutes to cause setting of the sludge on gel formation. Actually the lower heating time in the range given will be preferred because it has been found that at the lower heating time improved yields of ammonium sulfate are obtained.

Connecting into the lower portion of heating and gelling zone 12 is an extruder 16 which serves to move the gelled mass from zone 12. Extruder zone 16 is jacketed with a jacket 17 through which may be circulated a cooling medium by lines 18 and 19. The temperature of the gelled sludge moved through extrusion zone 16 may suitably be reduced to a temperature in the range between 125° and 200° F. The extruder 16 moves the gelled mass through line 20 into a breaker box 21 containing breaker 22 where the gelled sludge is broken up into small particles and allowed to drop by way of line 23 into neutralization zone 24. Line 23 is provided with line 25 controlled by valve 26 by way of which water or an aqueous solution may be admixed with the broken particles of gelled sludge dropping through line 23. Introduction of water or an aqueous solution, such as an aqueous solution of ammonium sulfate which may be obtained at a latter stage in the process as will be described, may serve to quench or reduce the temperature of the gelled sludge. Whether or not the temperature of the gelled sludge is reduced prior to its entrance into neutralization zone 24, it has admixed with it therein ammonium hydroxide which is introduced by line 27 from a source not shown. In neutralization zone 24 the admixture of ammonium hydroxide and gelled sludge is intimately contacted by contacting or mixing means, not shown, to cause substantial neutralization of the sulfuric acid bodies in the gelled formation. Although a sufficient amount of ammonium hydroxide may be added to neutralization zone 24 to neutralize substantially the acidic constituents of the gelled sludge, it may be desirable to add an amount sufficient to provide a mixture therein having a pH of 5.5 to 6.5.

The neutralized mixture is removed from neutralization zone 24 by line 28 and routed into a filtration zone 29 which may be a rotary filter or one of the leaf type wherein carbonaceous bodies are filtered from the aqueous solution of ammonium sulfate to allow recovery of the latter, the carbonaceous material being discharged from filter 29 by line 30 for further treatment as will be described. The ammonium sulfate solution is recovered as a filtrate from filter 29 and is discharged therefrom through line 31 into an evaporation zone 32. Evaporators are well known industrial equipment so will not be described in more detail here. In any event, evaporation zone 32 may operate at a reduced pressure to allow removal of water vapor by line 33. On application of suitable heat to zone 32 white ammonium sulfate crystals may be discharged from the evaporation zone 32 by line 34 and may be packed in bags for sale and use as a commercial fertilizer. While evaporation zone 32 has been illustrated as a single vessel, it is understood that zone 32 may be a series of evaporators to allow continuous operation. Also, while the carbonaceous material has been illustrated as removed by filtration, other methods of separation for removing the carbonaceous bodies are suitable. For example, the carbonaceous bodies may be separated by decantation or the mixture containing the solution of ammonium sulfate and carbonaceous bodies may be subjected to centrifugation.

The carbonaceous material discharged by line 30 may be dried by application of heat thereto which usually results in a volume decrease as high as 75% or sometimes in excess of this figure. Since as much as 30% of ammonium sulfate may be present in the dry carbon, the carbonaceous material may be leached or washed with water and the aqueous solution resulting therefrom recycled to quench or reduce the temperature of the acid after the gelling operation to neutralize acid decomposition. Alternatively the aqueous solution recovered by washing the carbon may be evaporated to recover an impure ammonium sulfate. The carbonaceous particles after the washing operation may be used as a fuel or may be discarded or dried and employed as an artificial zeolitic material having base exchange properties.

The invention will be illustrated further by reference to the following runs. A spent alkylation sludge, such as one employed in the patent to Wadley and Horeczy, supra, was heated to a temperature in the range of 280° to 325° F. This acid contained 87.4% of sulfuric acid and 5.52% carbon. The acid was heated for 30 minutes at 310° F. to cause setting thereof or gel formation. The colloidal mass was broken, stirred with water, and neutralized with ammonium hydroxide. Two extractions of the gelled sludge with ammonium hydroxide removed most of the sulfuric acid from the carbon as ammonium sulfate. The aqueous solution resulting therefrom yielded 80% of the theoretical yield of ammonium sulfate crystals. The ammonium sulfate crystals were substantially free of carbon, white in color, and without appreciable odor. The carbon was dried at 220° F. with a loss in volume of 75%. Analysis of the carbon showed 34% ammonium sulfate and carbon equivalent to 97% of that present in the original acid sludge.

Additional runs were made where the sulfuric acid sludge was neutralized without heat treatment. In these runs the sulfonic acids remained as water and acid soluble salts and contaminated the inorganic ammonium sulfate. The ammonium sulfate recovered from these runs was characterized by a high carbon content, bad odor and a brownish color, all of which are objectionable in commercial fertilizers.

Additional runs were made wherein sulfuric acid sludge similar to that described above was heated in one case for 5 minutes at 300° F. and another case at the same temperature for 15 minutes. A comparative run was made in which the sulfuric acid sludge was neutralized with ammonium hydroxide without heating. Subsequent to the heating operations in the two runs mentioned above, the gelled sludge was neutralized with ammonium hydroxide. After separation of carbon in the runs in accordance with the practice of the present invention, ammonium sulfate was recovered. Yield data and conditions employed in the runs are presented in the following table:

| Coking conditions: | | | |
|---|---|---|---|
| Temperature, °F | (¹) | 300 | 300 |
| Time, minutes | | 5 | 15 |
| Ammonium sulfate, percent of sludge acid | | 80 | 68 |
| Carbonaceous phase ² (calculated as carbon), percent of carbon in sludge | | 124 | 120 |
| Ammonium sulfate analysis: | | | |
| Carbon, percent | 3.92 | 0.22 | |
| Ammonium sulfite, percent | 0.22 | 0.07 | |
| Ammonium sulfate, percent | 97.8 | 99.0 | |

¹ Neutralized with ammonium hydroxide without heating.
² Possibly contains some sulfones and ammonium nitrate.

It will be seen from the foregoing runs that in accordance with the practice of the prior art the ammonium sulfate produced without gel formation contained a substantial amount of carbon whereas when the sulfuric acid sludge from an alkylation operation was heated for 5 minutes and its temperature reduced thereafter an ammonium sulfate of 99% purity was recovered which contained only 0.22% of carbon. It will be further noted that higher yields were obtained for the shorter period of heating with temperature reduction than after heating for the longer period.

It will be noted that the ammonium sulfate produced in accordance with the present invention contains a small amount of ammonium sulfite. The small amounts of this compound are not objectionable in fertilizer materials.

In contrast to the prior art method, the present invention allows the recovery of substantially carbon-free ammonium sulfate crystals. To illustrate this further, runs were made in accordance with the prior art. In one run spent alkylation acid was neutralized with ammonia at a temperature below 200° F.; no gelling was realized. The material was settled and carbonaceous material decanted from the solution. Crystals formed in the solution were filtered, and the mother liquor was further evaporated and ammonium sulfate crystals obtained therefrom. The ammonium sulfate had a strong odor of nitrogen bases, was dark in color, and had additional odors associated with those of hydrocarbon acid sludges.

In another run the spent alkylation acid had added to it sufficient ammonium sulfate to form a substantially saturated solution of ammonium sulfate in the acid. The mass was maintained at a temperature of about 150° F. and liquid ammonium hydroxide was added. The material was stirred and then settled for 10 minutes. A carbonaceous material formed as a top layer and this was separated. Because of the gummy, sticky characteristics of the material, it was difficult to get complete separation. The resulting aqueous solution was brown in color and contained finely divided sludge particles and oil. It was heated to concentrate the ammonium sulfate and then filtered to recover crystals. The resulting ammonium sulfate was brown, contained small particles of carbonaceous material throughout, and the odor was distinctly acid. In contrast, it was found that the material produced after heating, gelling, and treating with ammonium hydroxide separated into a layer of hard carbonaceous material and a colorless solution. The solution may be evaporated to dryness to produce ammonium sulfate crystals that are white, odorless, and of high purity.

Acid sludges other than spent alkylation acid are unsatisfactory for use in the practice of the present invention because they do not gel satisfactorily and in addition produce low yields of unsatisfactory product. For example, an acid sludge resulting from the treatment of a high boiling cracked naphtha was heated at a temperature of 290° F. for 10 minutes. No gelling occurred and considerable $SO_2$ evolution was observed. The material was cooled and treated with ammonium hydroxide. A brownish resin was separated from which an unattractive yield of ammonium sulfate was obtained. Although it is possible to make such sludges, such as the cracked naphtha sludge, gel by adding concentrated $H_2SO_4$ thereto prior to the heating operation, the acid in the sludge is reduced to $SO_2$ and only negligible yields of ammonium sulfate are recovered.

It will be seen from the foregoing runs that the present invention is vastly superior to the prior art methods and produces a substantially pure ammonium sulfate of a white crystalline nature.

The heating and gelling operation may be suitably carried out at atmospheric pressures; however, it may be desirable to use superatmospheric pressure as high as 150 lbs. per sq. in. since it has been observed that before and during the gelling operation $SO_2$ evaporation occurs. It is believed that employment of superatmospheric pressures may prevent loss of the evolved $SO_2$ and the $SO_2$ may be induced to enter into the reaction by formation of sulfone polymers which is believed to occur at least to some extent.

The nature and objects of the present invention having been completely described and illustrated, what I wish to claim as new and useful and to secure by Letters Patent is:

1. A process for producing ammonium sulfate which comprises heating sulfuric acid sludge derived from the alkylation of olefins with isoparaffins in the presence of strong sulfuric acid and containing substantial quantities of carbonaceous bodies to a temperature in the range between 280° and 325° F. to cause gelation, admixing said heated and gelled sludge with a sufficient amount of ammonium hydroxide to obtain substantial neutralization thereof, removing carbonaceous bodies and recovering an aqueous solution of ammonium sulfate from the substantially neutralized sludge, and evaporating said solution to recover crystals of ammonium sulfate substantially free of carbon.

2. A process in accordance with claim 1 in which the carbonaceous bodies are removed by filtering the substantially neutralized sludge.

3. A process for producing ammonium sulfate which comprises heating sulfuric acid sludge derived from the alkylation of olefins with isoparaffins in the presence of strong sulfuric acid and containing substantial quantities of carbonaceous bodies to a temperature in the range between 280° and 325° F. to cause gelation of said sludge, admixing said heated and gelled sludge with an amount of ammonium hydroxide sufficient to provide a mixture having a pH in the range from 5.5 to 6.5, removing carbonaceous bodies and recovering an aqueous solution of ammonium sulfate from the mixture, and evaporating said solution to recover crystals of ammonium sulfate substantially free of carbon.

4. A process in accordance with claim 3 in which the carbonaceous bodies are removed by filtering the mixture.

5. A process for producing ammonium sulfate which comprises heating sulfuric acid sludge derived from the alkylation of olefins with isoparaffins in the presence of strong sulfuric acid and containing substantial quantities of carbonaceous bodies to a temperature in the range between 280° and 325° F. to cause gelation of said sludge, reducing the temperature of the heated and gelled sludge to a temperature no greater than 200° F., admixing said heated and gelled sludge after said temperature reduction with an amount of ammonium hydroxide sufficient to provide a mixture having a pH in the range from 5.5 to 6.5, removing carbonaceous bodies and recovering an aqueous solution of ammonium sulfate from the mixture, and evaporating said solution to recover crystals of ammonium sulfate substantially free of carbon.

6. A process in accordance with claim 5 in which the temperature of the heated and gelled sludge is reduced by indirect cooling.

7. A process in accordance with claim 5 in which the temperature of the heated and gelled sludge is reduced by quenching same with an aqueous solution.

8. A process in accordance with claim 5 in which the carbonaceous bodies are removed by filtering the mixture.

9. A process for producing ammonium sulfate which comprises heating sulfuric acid sludge derived from the alkylation of olefins with isoparaffins in the presence of strong sulfuric acid and containing substantial quantities of carbonaceous bodies to a temperature in the range between 280° and 325° F. to cause gelation, reducing the temperature of the heated and gelled sludge to a temperature no greater than 200°, admixing said heated and gelled sludge after said temperature reduction with a sufficient amount of ammonium hydroxide to obtain substantial neutralization thereof, removing carbonaceous bodies and recovering an aqueous solution of ammonium sulfate from the substantially neutralized sludge, and evaporating said solution to recover crystals of ammonium sulfate substantially free of carbon.

10. A process for producing ammonium sulfate which comprises heating sulfuric acid sludge derived from the alkylation of olefins with isoparaffins in the presence of strong sulfuric acid and containing substantial quantities of carbonaceous bodies to a temperature in the range between 280° and 325° F. to cause gelation, reducing the temperature of the heated and gelled sludge to a temperature in the range between 125° and 200° F., admixing said heated and gelled sludge after said temperature reduction with a sufficient amount of ammonium hydroxide to obtain substantial neutralization thereof, filtering said substantially neutralized sludge to remove carbonaceous bodies, recovering an aqueous solution of ammonium sulfate as filtrate from said filtering step, and evaporating said recovered solution to recover crystals of ammonium sulfate substantially free of carbon.

11. A process in accordance with claim 10 in which the temperature of the heated and gelled sludge is reduced by quenching same with an aqueous solution.

12. A process for producing ammonium sulfate which comprises heating sulfuric acid sludge derived from the alkylation of olefins with isoparaffins in the presence of strong sulfuric acid and containing substantial quantities of carbonaceous bodies to a temperature in the range between 280° and 325° F. to cause gelation, reducing the temperature of the heated and gelled sludge to a temperature in the range between 150° and 200° F., admixing said heated and gelled sludge after said temperature reduction with a sufficient amount of ammonium hydroxide to provide a mixture having a pH in the range from 5.5 to 6.5, filtering said mixture to remove carbonaceous bodies, recovering an aqueous solution of ammonium sulfate as filtrate from said filtering step, and evaporating said recovered solution to recover crystals of ammonium sulfate substantially free of carbon.

ALBERT J. SHMIDL.

No references cited.